(12) United States Patent
Twerdochlib

(10) Patent No.: US 7,533,572 B2
(45) Date of Patent: May 19, 2009

(54) HIGH BANDWIDTH FIBER OPTIC VIBRATION SENSOR

(75) Inventor: Michael Twerdochlib, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 350 days.

(21) Appl. No.: 11/504,506

(22) Filed: Aug. 15, 2006

(65) Prior Publication Data

US 2008/0041162 A1    Feb. 21, 2008

(51) Int. Cl.
*G01N 29/04* (2006.01)
*G01B 9/02* (2006.01)
(52) U.S. Cl. .................. 73/657; 356/28.5; 356/482
(58) Field of Classification Search .................. 73/643, 73/657
See application file for complete search history.

(56) References Cited

U.S. PATENT DOCUMENTS

| | | | |
|---|---|---|---|
| 4,833,453 A | 5/1989 | Twerdochlib | |
| 4,834,111 A * | 5/1989 | Khanna et al. | 600/587 |
| 4,875,373 A | 10/1989 | Twerdochlib | |
| 4,900,919 A | 2/1990 | Twerdochlib | |
| 5,146,776 A | 9/1992 | Twerdochlib | |
| 5,469,745 A | 11/1995 | Twerdochlib | |
| 5,814,730 A * | 9/1998 | Brodeur et al. | 73/597 |
| 6,323,943 B1 * | 11/2001 | Maruyama et al. | 356/28.5 |
| 6,470,753 B2 * | 10/2002 | Maruyama | 73/657 |
| 6,671,638 B2 * | 12/2003 | Kitazumi et al. | 702/75 |
| 2005/0123230 A1 | 6/2005 | Twerdochlib | |

OTHER PUBLICATIONS

Mike Hoffer, et al, Stator Bar Vibration Sensors and Fiber-Optic Accelerometers, New Tools Used to Measure Stator Winding Vibration in Large Turbine Generators, 17 pages.
FOA-100: Optical Accelerometer; [online]; 12 pages; retrieved from www.vibrosystm.com, Datasheets, FOA; VibroSystM, Longueuil (Quebec) Canada.

* cited by examiner

*Primary Examiner*—Hezron Williams
*Assistant Examiner*—Rose M Miller

(57) ABSTRACT

Apparatus and method for monitoring vibration levels in rotatable machinery (52). In one embodiment, a system (50) includes a source (66) for generating coherent radiation (70) and a first partially transmissive, partially reflective device (90) positioned to receive radiation (70) from the source (66) and transmit a part of the radiation there through. A second partially transmissive, partially reflective device (100) is mounted to the machinery (52), positioned to reflect a first signal (72) and transmit radiation (70) transmitted by the first device (90). A third device 104) is mounted to the machinery (52) and positioned to reflect radiation transmitted through the second device to provide a second signal (78). Circuitry (82, 86) is configured to generate an electrical signal based on a combination of the first and second signals (72, 78), and processing circuitry (114) provides a value indicative of vibration amplitude occurring in the machinery (52) based on the combination of the first and second signals. An embodiment of an associated method includes providing a first radiation signal (70) of a first frequency, deriving second and third radiation signals (78A, 78B) each having a time-varying Doppler shifting frequency relative to the first signal, and providing a value indicative of vibration amplitude occurring in the machinery (52) based on a combination of the second and third signals.

22 Claims, 6 Drawing Sheets

HIGH BANDWIDTH FIBER OPTIC VIBRATION SENSOR

FIELD OF THE INVENTION

The present invention relates generally to rotating machinery and, more particularly, to a system for monitoring the vibration of a rotating machine.

BACKGROUND OF THE INVENTION

Machinery of the reciprocating type and more generally of the rotational type can undergo varying levels of vibration which may be a result of wear or other causes of imbalance. For large rotating machinery such as used in power generation, vibrations may occur in the axial, radial or rotational direction. It is often necessary to monitor such vibration to ascertain whether the vibrational energy, e.g., such as determinable by measurement of vibration amplitude, is approaching a deleterious level.

Vibration detection in large industrial machinery is of great importance in order to monitor safety and efficiency. Because excessive vibration can result in equipment down-time and costly damage to components, it is desirable to provide for continuous monitoring and rapid intervention to prevent damage. For example, proximity probes and accelerometers are routinely used to measure mechanical vibration in large electric generators.

During the expected useful life time of power generators, there is sufficient thermal cycling (i.e., cyclic expansion and contraction), movement of stator bars and abrasion of insulator surfaces, that component vibration increases over time. This vibration occurs in response to the strong rotating alternating magnetic fields with which large currents are induced in the associated windings. From the standpoint of preventive maintenance, end-winding vibration is controllable with support systems, but these systems nonetheless require vibration monitoring in order to determine when adjustment or tightening or replacement is needed in order to reduce vibration. As many generators approach their original life expectancies there is a growing need to provide more accurate real-time diagnostics in order to provide timely service and avoid failures.

State-of-the-art vibration detectors have used fiber optic sensors mounted within an electric generator, usually on a stator coil end-turn. An example of a fiber optic sensor can be seen in FIG. 1. With the sensor attached to the generator, as vibrations occur, a sensor reed 14, extending from a mount 12 within a sensor casing 10, also vibrates. Fixed at the end of the sensor reed is a grid 2 that physically passes through a gap in a fiber optic cable 8. As the grid vibrates at the end of the sensor reed, the incoherent light passing through the grid is modulated by the associated grid pattern in a measurable manner. See, also, my U.S. Pat. No. 4,875,373 which is incorporated herein by reference.

In the past, a multi-fiber, optical cable providing light to and from the sensor has extended from a preamplifier unit outside the generator, passing into the generator shell through a seal, to a vibration sensor where the incoming light is modulated by the grid pattern. The light is transmitted to the sensor through a first optical fiber. After modulation at the sensor the light is then transmitted through a second optical fiber and back through the seal to a preamplifier. A main chassis unit, connected to the preamplifier unit, analyzes the signal from each of several sensor channels.

In a typical prior art set up, as shown for two sensors in FIG. 2, a pair of fiber optic cables 22 for each sensor passes through a port 24 in the generator wall 26. Typically, generators will have 12 to 16 vibration sensors, and 24 to 32 channels of fiber optic cable. In order to maintain pressure inside of the generator, individual fiber optic channels have had to pass through separate fiber optic seals 28 designed to withstand the internal pressure of the generator. While intended to be hermetic, the fiber optic seals are subject to leakage from within the generator and this has posed a major safety issue, especially considering that the generators typically contain hydrogen under pressure, i.e., 75 pounds per square inch (PSI). Technical difficulties associated with passing fiber optic cables through pressure seals (having problematic weak points) has resulted in the practice of positioning optical components on the high pressure side of a connector seal within the generator itself and converting the optical signals to electrical signals. Electrical wires then pass the signals through the hermetic seal. Non-optical components, like the preamplifier and multiplexer, may also be placed on the high pressure side of the connector seal, or on the low pressure side and along the generator casing depending on need. See my patent application U.S. 2005/0123230 which is assigned to the assignee of the present invention and now incorporated by reference. In these configurations there is an electrical rather than an optical feed-through at the generator wall. This provides a high-integrity hermetically sealed pressure boundary by avoiding rubber fiber optic seals which are prone to leaks and require careful alignment of abutting fibers.

Thus reliable systems are available for monitoring optical information generated from machine vibrations. However, the accuracy and bandwidth of vibration monitoring systems remains limited. While systems which measure vibration levels at single frequencies can be very accurate, other optical systems which measure vibration over a limited range of frequencies, e.g., up to 350 Hz, are subject to notable accuracy limitations. There is a continued need to use optical vibration monitors in the presence of high-intensity rotating alternating electromagnetic fields because traditional electromagnetic sensors are not suitable alternatives for accurately detecting levels of generator vibration signals in this type of environment. That is, with generator windings having a high, e.g., 20 KV, electrical potential, conducting wires cannot be brought in to the windings. Optical methodologies for monitoring broad band vibration levels in large electrical machinery have been accuracy-limited in part because level detection based on light amplitude measurement. It would be beneficial to provide broad band optical vibration monitors which more accurately and comprehensively monitor vibration levels in large electromechanical systems.

BRIEF DESCRIPTION OF THE DRAWINGS

The present invention can be more easily understood and the advantages and uses thereof will be more readily apparent when the following detailed description is read in conjunction with the following figures, wherein.

Figure 1:
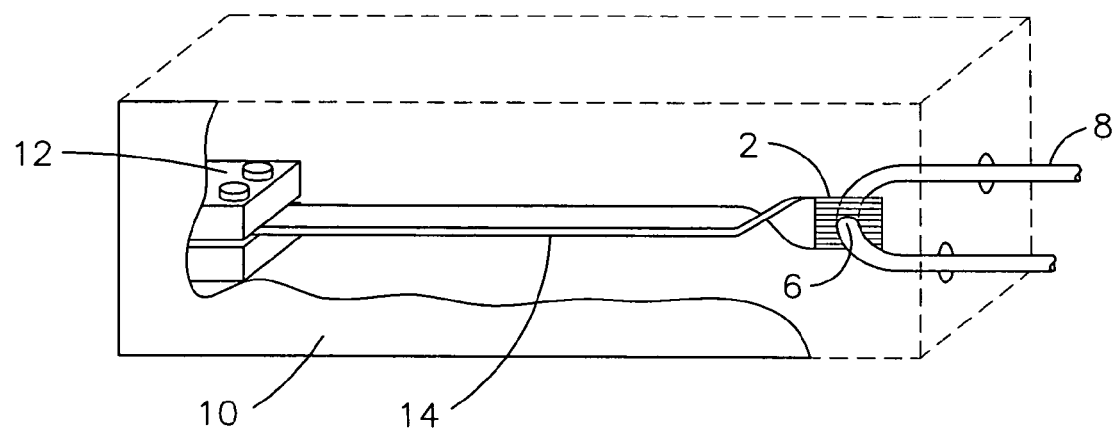
FIG. 1 illustrates a prior art vibration sensor.

Numerous components are shown in the figures as discrete elements for clarity of illustration while it will be understood by those familiar with optical systems that such components may be integrated with one another, e.g., within an optical fiber. In accordance with common practice, the various described device features are not drawn to scale, but are drawn to emphasize specific features relevant to the invention. Like reference characters denote like elements throughout the figures and text.

DETAILED DESCRIPTION OF THE INVENTION

The present invention provides a system and method for measurement of vibration in rotating or reciprocating machinery. When applied to hydrogen-cooled, large electric power generators, the system may include electrical feedthroughs as described in U.S. 2005/0123230 to provide a stronger and more reliable seal than attainable with a fiber optic feed-through. With this arrangement, it is possible to locate the optical components (e.g., the fiber optic light source and light detector) for each sensor on the high-pressure side of the seal following the hermetic electrical feedthrough, while placing non-optical components on the other side of the seal. Associated power feeds and analog sensor signals indicative of vibration, may pass through the electrical feed-through to preamplifier circuitry on the outside of the seal and in direct electrical connection with a main chassis unit. Alternately, as described herein for an embodiment of the invention, the pre-amplifier circuitry may also be positioned on the high pressure side of the seal.

Figure 3:
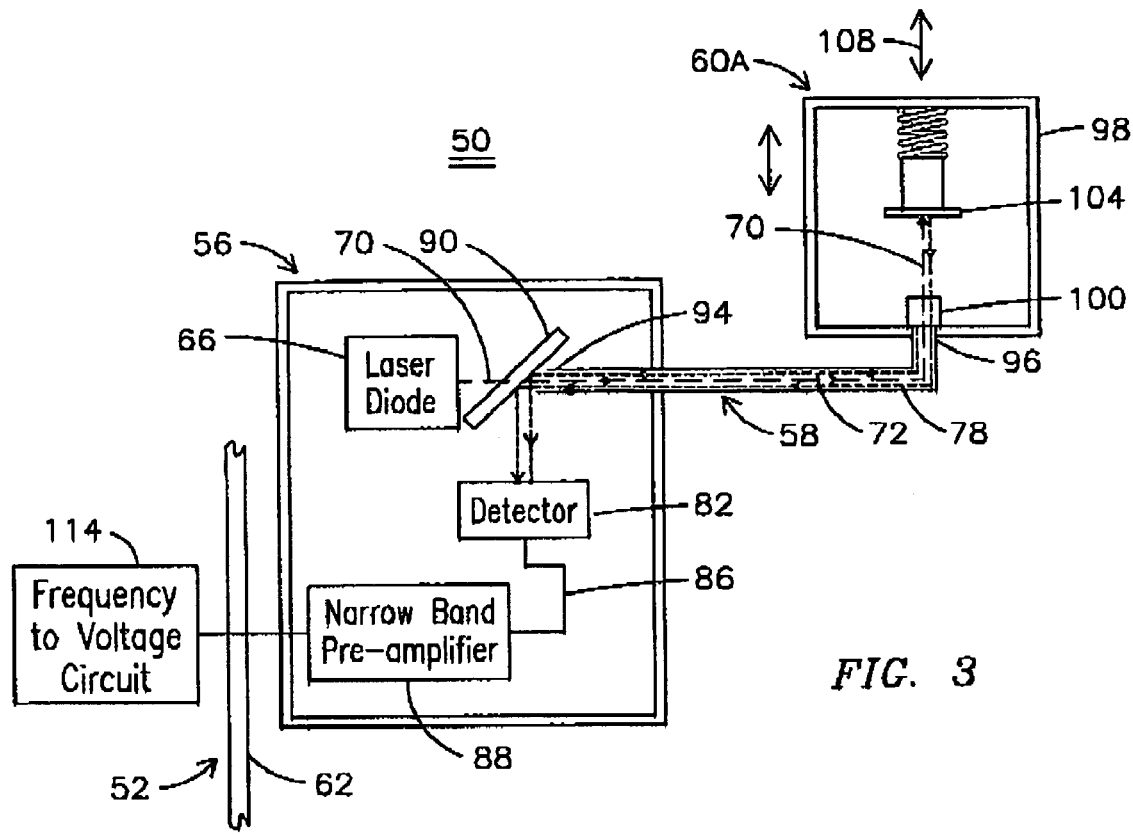
FIG. 3 schematically illustrates a system for monitoring vibration according to the invention.

FIG. 3 illustrates a system 50, according to a first embodiment of the present invention, configured to measure vibration levels about a large industrial electric generator 52. Although a single vibration sensor channel is described, it is to be understood that embodiments according to the invention may include additional sensor components providing 16 or more channels of vibration information.

Generally, the system 50 includes an optical source and detector unit 56 coupled through a single optical fiber 58 to transmit signals to and receive signals from an optical sensor section 60A which may be rigidly mounted on, for example, a stator coil end turn. All of the now-described, associated optical components may be contained within the generator 52 on the pressurized side of a generator wall 62.

A laser diode 66 is powered to provide coherent radiation 70 through the optical fiber 58 to the sensor section 60A which is mounted on the generator and mechanically coupled to receive generator vibrations. Within the sensor section 60A, the vibration induces Doppler shifts which modulate the light frequency of the laser radiation 70 to generate a frequency-encoded radiation signal 78. Although this and other embodiments are described in the context of Doppler frequency shifts, it is to be understood that the invention may, alternately, be described in terms of wavelength shifts based on the Doppler effect.

Figure 5:
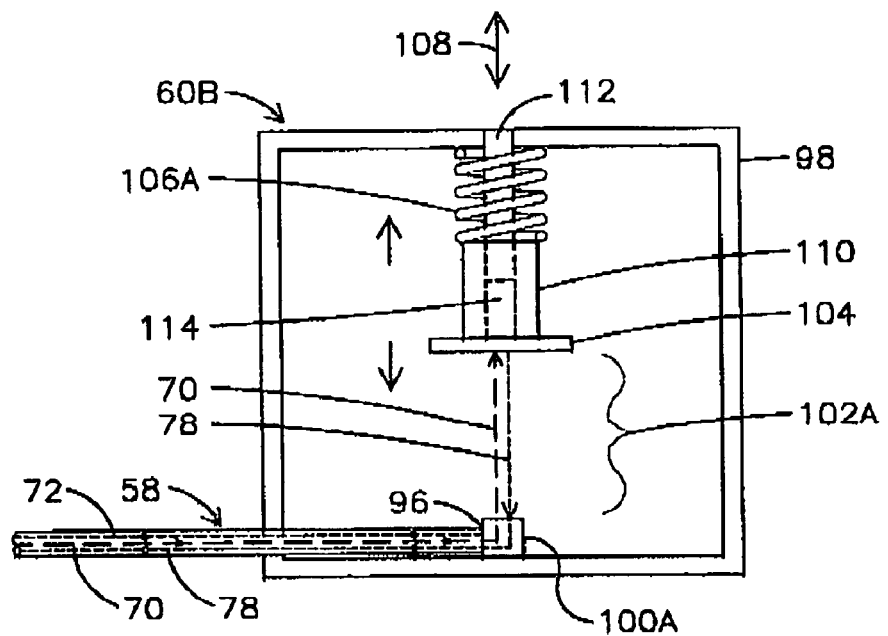
FIG. 5 illustrates an optical receiver section suitable for use in the system of FIG. 3 according to a first alternate embodiment.
Figure 6:
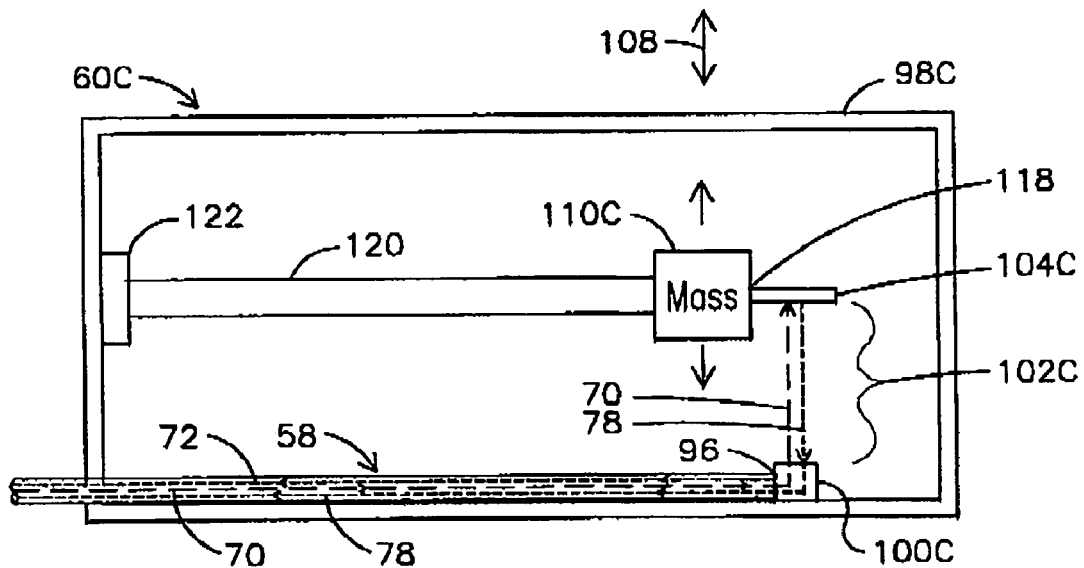
FIG. 6 illustrates an optical receiver section suitable for use in the system of FIG. 3 according to a second alternate embodiment.

As also described in conjunction with the alternate sensor section configurations of FIGS. 5 and 6, the frequency-encoded signal 78 may, within the sensor section, be mixed with a sample signal 72 of the non-modulating radiation 70. Generally, as shown in FIG. 3, both the signal 72 and the signal 78 exit the sensor section 60A and travel a mutual path returning to the optical source and detector unit 56 through the same fiber 58. A detector 82 receives the signals 72 and 78, and provides an electrical signal comprising a variable beat frequency which corresponds to the optical beat frequency that results from mixing of the two radiation signals 72 and 78.

Figure 4:
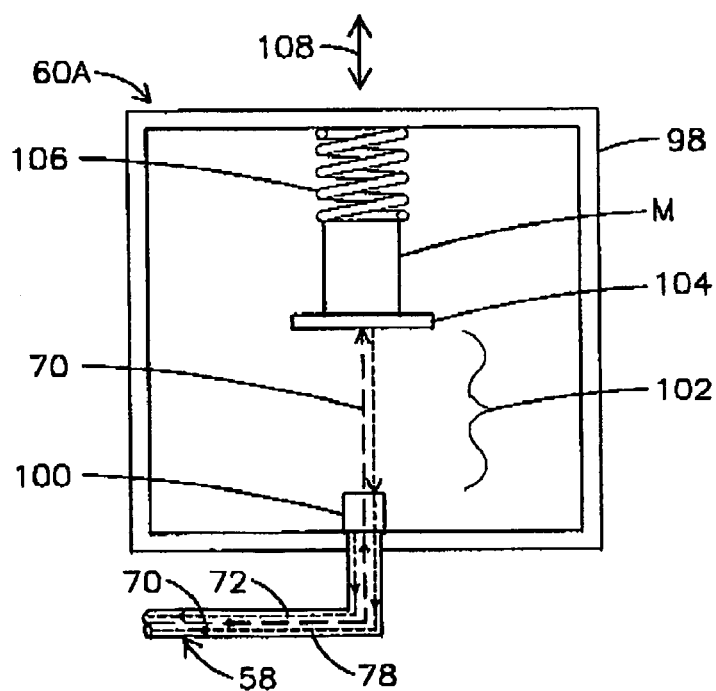
FIG. 4 provides an enlarged view of a sensor receiver section also illustrated in FIG. 3.
Figure 7:
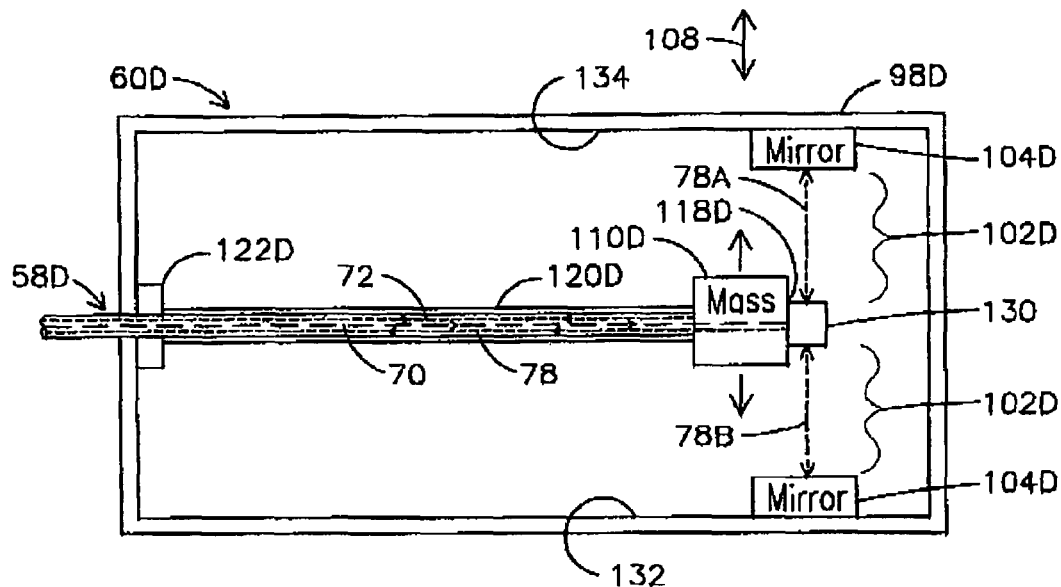
FIG. 7 illustrates an optical receiver section suitable for use in the system of FIG. 3 according to a third alternate embodiment.

Initially, the radiation 70 propagates from the diode 66 through an illustrated half silvered mirror or, more generally, a partially transmissive, partially reflective splitter device 90, and into a first end 94 of the optical fiber 58. The function of the device 90 may be integrated within the optical fiber 58. The radiation 70 then travels through the fiber 58 to a second fiber end 96 positioned within a sensor case 98 of the sensor-receiver section 60A. A second partially reflective, partially transmissive device, e.g., in this example, a partially reflective graded index (GRIN) lens 100 is rigidly mounted to the fiber 58 and the fiber is in turn rigidly mounted to case 98. The function of the lens 100 may also be integrated within the optical fiber 58. The amount of reflection from the lens 100 may be adjusted with the amount of reflective coating applied thereto. The GRIN lens 100 focuses and transmits almost all the received light through an air space 102 to a seismic mounted mirror 104 and receives a small amount of light reflected back from the mirror 104 for propagation to the detector unit 56. See, also, the simplified illustration of the sensor-receiver section 60A in FIG. 4. While the sensor-receiver section 60A embodies operating concepts of an optical sensor according to the invention, the embodiments of FIGS. 5-7 are believed to be more practical implementations of a sensor-receiver section for the system 50.

Sensor operation may be best understood with an example wherein it is assumed that the sensor case 98 is vibrating with the generator 52 at a frequency of 120 Hz. In the section 60A the mirror 104 is mounted to a spring 106 to have a translational degree of freedom relative to the case 98 primarily along an axis 108 which is parallel to the direction of radiation propagating from the GRIN lens 100 to the mirror 104 and back to the GRIN lens 100. Preferably, the mirror 104 has relatively little or no movement relative to movement of the case 98 in all directions other than along the axis 108. With the mirror 104 flexibly coupled, e.g., via the illustrated spring 106, to the sensor case 98 primarily along the direction of gravitational force, the mirror resonant vibration frequency is modified with a suitable mass M and spring constant "k" of the spring 106 to remain relatively isolated from case vibration occurring along the direction of the axis 108. In this example, the axis 108 is parallel with the direction of gravitational force acting on the mirror 104 and the major translational axis of the spring 106.

With the spring 106 isolating the mirror 104 from the generator and case vibration, the mirror 104 has relatively little or no movement within the vibration range of interest (e.g., including 120 Hz) along the axis 108 in response to generator vibration. On the other hand, the mirror 104 is not isolated from the case 98 in directions other than along the axis 108 so as to allow movement of the mirror with the case in all directions other than along the axis 108. To the extent case vibration occurs in directions other than along the direction of the axis 108, there may be off-axis (i.e., relative to axis 108) motion of the mirror 104 as the case and the GRIN lens move together. Depending on the amplitude of off-axis vibration, the size of the mirror, and the extent to which off-axis movements of the lens 100 and mirror 104 are not in phase with one another, such mirror movement may result in displacements which prevent reflection of the signal 78. As long as the off-axis case vibration is of sufficiently small amplitude, the mirror will remain in satisfactory optical alignment with the lens 100 that the sensor 60A will function to reflect the frequency shifted signal 78 back through the fiber 58.

Ideally, while the mirror 104 is mounted to not vibrate in a direction transverse to the direction of propagation of the radiation signal 78, the partially reflective lens 100, being rigidly mounted to the case 98, does vibrate with the case 98 along a direction parallel with the axis 108. Generally, operation of the sensor 60A is based on relative isolation of the mirror 104 with respect to the lens 100 in one of three dimensions. With the mirror decoupled from motion of the GRIN lens 100 in directions of the axis 108, but coupled along other directions orthogonal to the lens 100, Doppler shifts occur as the radiation exits the lens 100. Consequently, a small, time varying Doppler shift is present in the frequency of radiation 78 reflected from the mirror back through the fiber 58. That part of the radiation 70 reflected from the GRIN lens, i.e., the reference radiation signal 72 is not frequency modulated. The frequency-encoded radiation signal 78 and the signal 72 together propagate through the fiber 58 to the optical source and detector unit 56.

Figure 2:
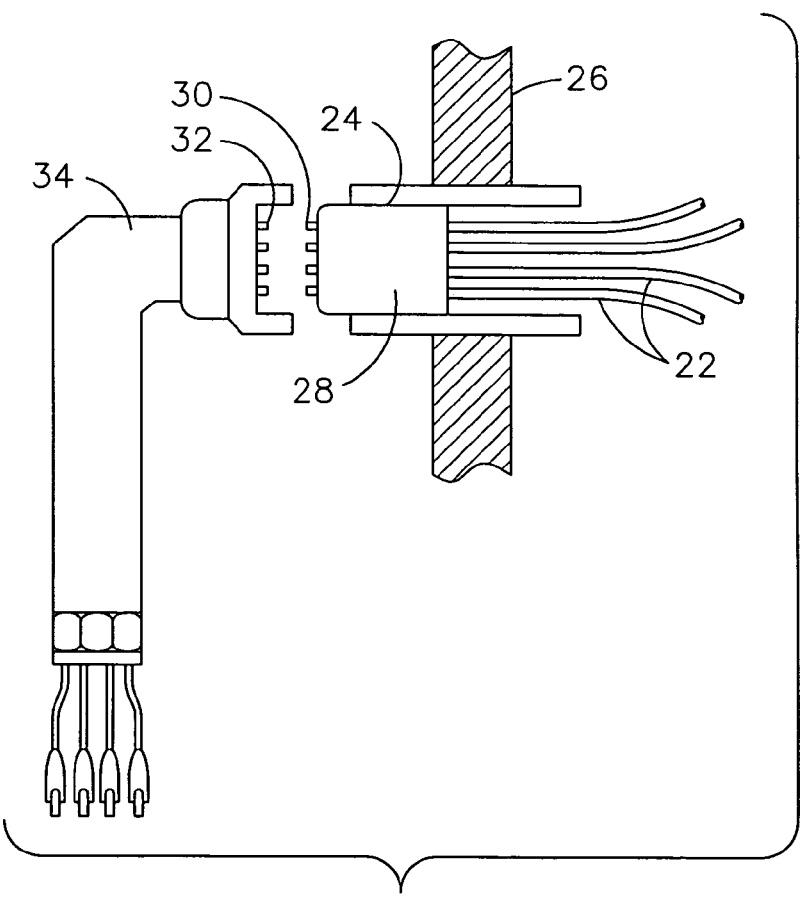
FIG. 2 illustrates a prior art arrangement of select components used in vibration monitoring of an electromechanical system.

In the detector unit 56 portions of the signals 72 and 78 reflect from the splitter device 90 (schematically shown as a half silvered mirror) to the detector-receiver 82. Mixing of the signals 72 and 78 within the detector-receiver 82 results in an electrical beat signal having a variable frequency in accord with the time varying velocity of vibration displacements on the generator 52 and on the case 98 along directions parallel with the axis 108. With appropriate pre- or post-filtering, the beat frequency signal 86 is converted into an isolated electrical signal for input to a narrow band preamplifier 88. The resulting output from the preamplifier is routed through a cable bus, such as illustrated in FIG. 2 or in U.S. 2005/0123230, to a main chassis unit for processing and determination, for example, of vibration amplitude, and whether the vibration amplitude has exceeded a predetermined threshold.

The beat frequency $f_b$ produced by mixing the signals 72 and 78 in the detector-receiver 82 is one half of the Doppler shift $f_d$:

$$f_b = f_d/2 = f_c u/(2c) = u/\lambda_c,$$

where $f_c$ is the frequency of the non-modulated radiation sample 72 (and 70), $\lambda_c$ is the wavelength of the laser radiation 70, c is the speed of light and u is the time varying vibration velocity occurring along the directions of the axis 108 on the GRIN lens 100 and the case 98.

After processing through the narrow band preamplifier 88, an analog frequency-to-voltage circuit 114 converts the beat frequency signal $f_b$ into a voltage signal which is then scaled by $2c/f_c$ to determine u, the real-time velocity of vibrations on the seismic mounted mirror 104. Alternately, the average speed of vibration can be determined.

By way of example, under normal operating conditions a typical end turn vibration amplitude peak may be 0.5 mm. At 120 Hz, with harmonic motion, the peak velocity, u, is equal to $2\pi(0.5 \text{ mm})*120 \text{ Hz}=377 \text{ mm/sec}=0.377 \text{ m/sec}$.

Generally, for harmonic motion with a peak amplitude A, the displacement x is equal to $A \sin(2\pi f_c t)$, while the instantaneous velocity, u, is $2\pi A f_c \cos(2\pi f_c t)$, where $f_c$ is the frequency of the vibration and t is time. The frequency $f_c$ is determined from the measured beat frequency $f_b$, and the velocity, u, may be calculated from this. The peak velocity U may be found as a function of the peak amplitude, A:

$$U=2\pi A f_c$$

and the vibration waveform may be obtained by integrating u(t).

With the 0.5 mm peak amplitude the peak velocity, U, is 0.377 m/sec. Using a laser diode 66 which generates radiation of $\lambda_c=1000$ nm wavelength ($3\times10^{14}$ Hz), a maximum 188 KHz beat frequency shift will result. Using the system 52 to measure this beat frequency, the time dependent and average vibration velocities and the vibration amplitude are determined.

The associated method of measuring vibration parameters is highly accurate. For example, a five percent change in a 0.5 mm amplitude corresponds to an 18 KHz shift in the beat frequency. Prior systems using a grid sensor (such as described in U.S. Pat. No. 4,875,373) would exhibit a frequency sensitivity on the order of only 180 Hz. Thus systems according to the invention can have a sensitivity $10^5$ times greater than previously available. The measured vibration characteristics can be directly correlated with vibration amplitude along surfaces of the generator 52.

The Doppler shifted frequency, upon which vibrational velocity and displacement (amplitude) are determinable, is based on relative motion between two surfaces, e.g., vibration of the lens 100 (rigidly mounted to the vibrating sensor case 98) and the seismic mirror 104 which is maintained in an inertial reference frame. The term inertial as used herein refers to the ability of the mirror 104 to remain relatively and approximately fixed in a stationary reference frame, thus being non-responsive to small vibration displacements occurring in the sensor case along the active direction of the axis 108, i.e., the vibration measurement axis. This vibration measurement axis is substantially normal to the reflective surface of the mirror and substantially co-directional with the path of radiation passing through the air space 102.

It may be advantageous for the mirror 104 to be absolutely stationary relative to case vibration and floating in a gravity-free environment so that it is completely non-responsive to movement of the case 98 along the vibration measurement axis 108. Such an ideal system would be rigidly affixed to the case 98 with respect to the remaining two spatial directions so the mirror 104 would vibrate with the case 98 in those directions. These conditions can at least be approximated. In the sensor 60A, combination of the mirror with an appropriate mass M and spring constant "k" will substantially decouple the mirror from the case frequency and set the natural resonant frequency of the mirror-mass-spring combination to less than (e.g., by a factor of two) the lower end of the desired measurement frequency range. It is preferred that natural vibration responses of the mirror-mass-spring combination be set at a frequency substantially below all excitation frequencies present in the machinery being monitored. Resonant responses of the mirror-mass-spring combination can be removed by filtering, e.g., after computing a Fourier Transform.

FIG. 5 illustrates an optical sensor section 60B, suitable for use in the system 50, wherein the radiation 70 propagates through the fiber 58 to the second fiber end 96 positioned within the sensor case 98 of the sensor section 60B. A partially reflective 90 degree graded index (GRIN) lens 100A is rigidly mounted to the sensor case 98 and connected to the second fiber end 96 so that a portion of the radiation 70 is transmitted through the GRIN lens 100A and then through an air space 102A to a seismic mounted mirror 104. The mirror 104 is mounted to have a translational degree of freedom relative to the case 98 primarily along an axis 108 parallel to the direction of propagation of the portion of the radiation 70 being transmitted from the GRIN lens 100A to the mirror 104. The mirror 104 is mounted to a mass 110 which is flexibly coupled, via the illustrated spring 106A, to the sensor case 98 primarily along the direction of gravitational force. The mass 110, in conjunction with a low spring constant "k" of the spring 106, allows the mirror to remain relatively isolated from case vibration occurring along directions parallel with the axis 108. The mass 110 is also configured to slidably extend from a rod 112. The rod 112 is of predetermined shape, e.g., rectangular or cylindrical while the mass 110 includes a cavity portion 114 of complimentary shape to that of the rod in order to matably receive the rod so that the rod may slide in and out of the cavity portion 114 as the case undergoes vibrational movement along the direction of the axis 108. Preferably, tolerances which allow the rod 112 to fit within the cavity portion 114 are sufficiently small to minimize movement of the mirror 104 in directions other than those parallel with the direction of the axis 108, thereby assuring that the mirror 104 is not so displaced off the axis 108 as to avoid reflection of the radiation which provides the signal 78. Provision of a rectangular shape to the rod 112 and the mating cavity portion 114 can limit rotational movement about the axis 108. To minimize friction during displacement of the rod 112 in and out of the cavity portion 114, the contacting surfaces can be provided with low friction coatings and lubricants. The arrangement of the mirror 104, mass 110, rod 112 and cavity portion 114, assures limited or no movement of the mirror 104 relative to the case 98 in directions other than along the axis 108. Accordingly, the mirror will predominantly vibrate in accord with vibratory motion of the case in all directions other than along the axis 108.

Referring next to FIG. 6, an optical sensor section 60C, suitable for use in the system 50, receives the radiation 70 propagating through the fiber 58 to the second fiber end 96 positioned within a sensor case 98C of the sensor section 60C. A partially reflective 90 degree graded index (GRIN) lens 100C is rigidly mounted to the sensor case 98C and connected to the second fiber end 96 to vibrate therewith. The lens 100C may be integrally formed with the fiber 58.

The signal 72 is a small reference signal reflected by the lens 100C and having the same frequency as the radiation 70 but propagating through the fiber 58 in an opposite direction to the optical source and detector unit 56. Doppler shifts are introduced into the signal 78 as the radiation exits the GRIN lens 100C and when the reflected light is received into the GRIN lens. The seismic mounted mirror 104C is coupled to receive the portion of the Doppler shifted radiation 78 which is transmitted through the GRIN lens 100C and then through an air space 102C. The signal 78 is reflected by the mirror 104C and back through the GIN lens 100C and through the fiber optic cable 58 to the optical source and detector unit 56.

The mirror 104C is affixed to a mass 110C which in turn is mounted to an unsecured end 118 of a flex-beam 120. An opposing end 122 of the flex-beam is securely mounted to the sensor case 98C. With this arrangement the mirror 104 has predominately one translational degree of freedom relative to the case 98C. The translational freedom is, for small displacements on the order of one millimeter, primarily and substantially along an axis 108 parallel to the direction of propagation of the portion of the radiation 70 being transmitted from the GRIN lens 100C to the mirror 104C. Movement of the mirror, relative to the sensor case, may actually be along an arc rather than a straight line as suggested by the axis 108, but for vibrational displacements on the order of one millimeter the arc motion of the mirror 104C is very close to that of a straight line. This can assure that reflected radiation, e.g., the signal 78, is received by the lens 100C. A small amount of spread may be introduced in the laser beam radiation along the path to and from the mirror 104C to further assure that at least some of the reflected light is received by the lens 100C although the mirror may undergo minor off-axis displacements. Since the vibration information is frequency encoded, the intensity of the received radiation need only be sufficient for the electronic components to measure the beat frequency. For the optical sensor section of FIG. 6, and subsequent embodiments now described, the orientation of the axis 108 is not limited to the direction of gravitational force.

The flex-beam 120 may, for example, be a bimetallic reed comprising phosphorous and bronze-copper alloys, similar in concept to the reed 14 of FIG. 1, but having appropriate dimensions such that in combination with the mass 110C and mirror 104C there is a relatively low, e.g., 10-20 Hz, resonant frequency, so as to not affect measurement of generator case vibration in a frequency range of interest, e.g., 30-1000 Hz. The flex-beam 120 provides direct coupling to the sensor case 98C in two dimensions while sustaining a near-ideal inertial response in directions along the axis 108. With the mirror 104C and mass 110C having a combined weight on the order of 100 grams, the flex-beam 120 may be dimensioned to have a thickness T of 0.008 inch, a width W of 0.25 inch and an overall length (measured from the mounting point on the case 98C to the mirror) of about 1.5 inches. Generally, the thickness and width and overall length of the flex-beam are dimensioned to provide a low spring constant along the direction of propagation of the radiation 70 and to effect a relatively rigid coupling between the mirror 104C and the case 98C along other orthogonal directions. The size of the mass 110C is determinative of the resonant frequency of the flex-beam/mass/mirror assembly.

In another embodiment, an optical receiver section 60D illustrated in FIG. 7, also suitable for use in the system 50, can provide twice the sensitivity gain than is attainable with the receiver section 60C of FIG. 6. In this design a flex-beam 120D includes an unsecured end 118D and a secured end 122D mounted to the sensor case 98D. The flex-beam 120D may be the same design, size and weight as described for the flex-beam 120 of FIG. 6. An optical fiber 58D extends from the detector unit 56 (see FIG. 3), into the sensor case 98D and along the flex-beam 120D to the unsecured end 118D of the flex beam. The radiation 70 follows this path to enter a beam splitter device 130 which provides two radiation beams 78A and 78B emitted in opposing directions therefrom. The beam splitter device 130 may be a split dual Grin lens integrally formed with the cable 58D. Each beam propagates from the device 130 through a different one of two air spaces 102D. The device 130 is aligned so that the beams 78A and 78B propagate in line with an axis 108 along which the flex-beam 120D has a degree of freedom. A mass 110D is mounted near the unsecured end 118D to provide an inertial factor determinative of resonant frequency for the flex-beam/mass/beam-splitter assembly as described with reference to FIG. 6.

In line with the axis 108, two mirrors 104D are positioned along opposing wall portions 132 and 134 of the sensor case 98D to each reflect a different one of the beams 78A or 78B back through an air space 102D to the beam splitter 130 for entry into the fiber 58. With this arrangement, when the case 98D is vibrating in a direction parallel with the axis 108, one of the mirrors 104D will have both a velocity and a displacement in a direction toward the beam splitter 130 while the other mirror 104D will have a velocity and a displacement in a direction away from the beam splitter. Accordingly, the two beams 78A and 78B are first and second signals which each incur Doppler frequency shifts in opposite directions from the other as the mirrors 104D vibrate with the case 98D. With this effect there is a net frequency shift between the beams 78A and 78B which is twice the Doppler shift incurred in the foregoing embodiments. This doubling of frequency shift increases the sensitivity with which vibration velocity and amplitude are measured relative to the sensor 60C of FIG. 6. The first and second signals combine to create a beat frequency which is twice the beat frequency that would be obtained with the embodiment of FIG. 6 for a given vibration amplitude.

Figure 8:
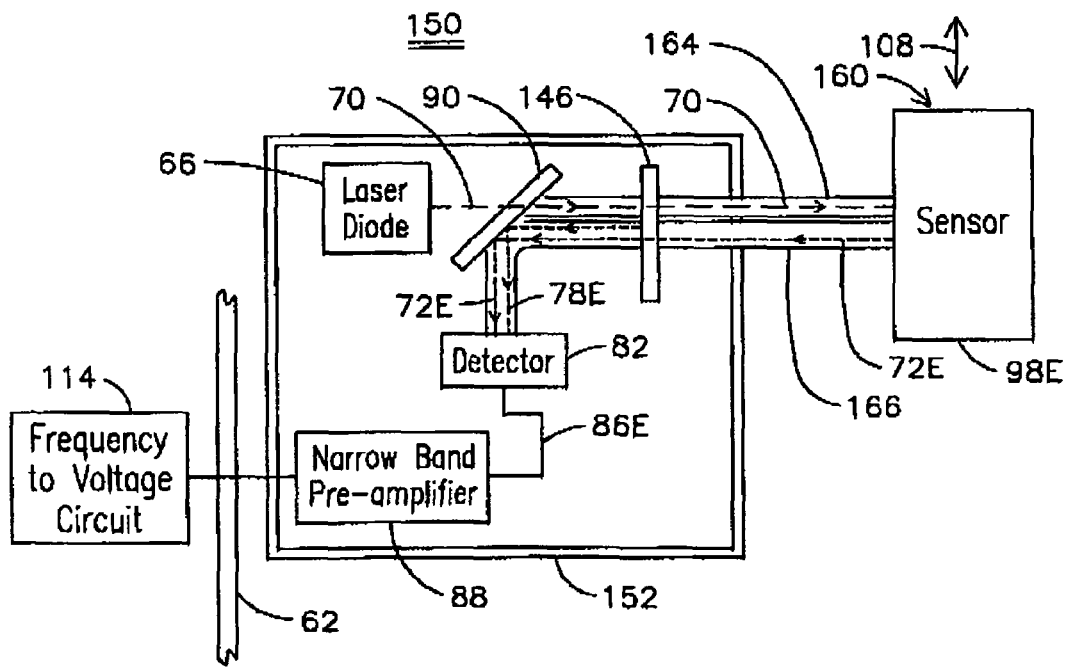
FIGS. 8 and 9 illustrate an alternate embodiment of a system for monitoring vibration according to the invention.
Figure 9:
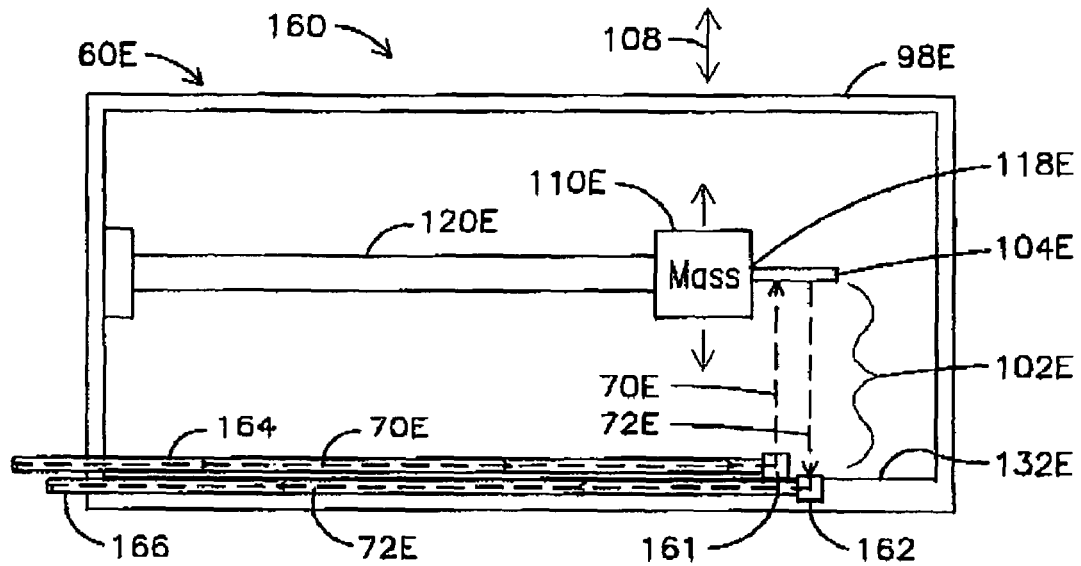

In the alternate configuration of the invention illustrated in FIGS. 8 and 9, a system 150 measures vibration levels about a large industrial generator 52. The system includes an optical source and detector unit 152 coupled through two optical fibers 164 and 166 to transmit signals to and receive signals from an optical sensor section 160 formed in a sensor case 98E, which may be rigidly mounted on, for example, a stator coil end turn of the generator 52. As described for the system of FIG. 3, all of the optical components associated with the system 150 may be contained within a pressurized region of the generator 52 on one side of the generator wall 62.

Initially, radiation 70 propagates from the laser diode 66 and through a first partially transmissive, partially reflective splitter device 90, schematically depicted as a half-silvered mirror, although the device 90 may preferably be integrally formed with an optical fiber. The radiation 70 then strikes a second partially transmissive, partially reflective device 146, which in the example embodiment is also depicted as a second half-silvered mirror, but may also be integrally formed with an optical fiber. The second device 146 transmits a portion of the radiation 70 in a path toward the sensor section 160, transmits a frequency modulating, Doppler shifted signal 72E received from the fiber 166 to the first device 90, and reflects a portion of the radiation 70, as an unmodulated signal 78E, to the first partially reflective device 90. The first device 90 is positioned to reflect both signals 72E and 78E toward the detector 82. Mixing of the signals 72E and 78E in the path from the mirror 146 to the detector 82 results in an optical beat signal having a time-varying frequency in accord with the time varying velocity of vibration displacements on the generator 52 and on the case 98 along a direction parallel with the axis 108. The detector 82 receives the signals 72E, and 78E, and generates an electrical signal comprising a variable beat frequency signal 86E corresponding to the optical beat frequency. With appropriate pre- or post-filtering, the beat frequency signal 86E is converted into an isolated electrical signal for input to a narrow band preamplifier 88.

The resulting output from the preamplifier 88 is routed through a cable bus, such as illustrated in FIG. 2 or in U.S. 2005/0123230, to a main chassis unit for processing and determination, for example, of vibration amplitude, and whether the vibration energy has exceeded a predetermined threshold. After processing through the narrow band preamplifier 88, an analog frequency-to-voltage circuit 114 (e.g., positioned in the main chassis unit) converts the beat frequency signal $f_b$ into a voltage signal which is then scaled by $2c/f_c$ to determine u, the real-time velocity of vibrations on the seismic mounted mirror 104. Alternately, the average speed or peak displacement of vibration can be determined. The velocity signal can be integrated to provide the time-varying vibration displacement.

As illustrated in FIG. 9, a seismic-mounted mirror 104E is positioned in the receiver section 60E along the unsecured end 118E of a flex-beam 120E, while the two optical fibers 164 and 166 extending from the optical source and detector unit 152 enter the sensor case 98E along a wall portion 132E. The flex-beam 120E may be the same design, size and weight as described for the flex-beam 120 of FIG. 6. The fiber 164 carries the radiation signal 70 to a first 90 degree GRIN lens 161 mounted along the wall portion 132E from which the signal propagates through an air space 102E to the mirror 104E. A second 90 degree GRIN lens 162, also mounted along the wall portion 132E and in the optical path of the mirror, receives the signal 72E reflected from the mirror and transfers the signal to the fiber 166 for propagation to the optical source and detector unit 152. The first and second GRIN lenses 161 and 162 are securely mounted to the case 98E so that they each vibrate with the case 98E. As described for the mirror 104C of FIG. 6, the mirror 104E is mounted to the combination of a flex-beam 120E and a mass 110E to allow primarily one translational degree of freedom relative to the case 98E along an axis 108. The axis 108 is parallel to the direction of propagation of the portion of the radiation 70E being transmitted from the GRIN lens 161 to the mirror 104E and the signal 72E transmitted from the mirror 104E to the GRIN lens 162. The mirror 104E has relatively little or no movement relative to the case 98 in directions other than along the axis 108, i.e., other than along the direction of propagation of the signal 72E between the mirror 104E and the lens 162. The signal 72E, upon entry into the optical fiber 166, includes a first Doppler frequency shift relative to the incoming signal 70 based on movement of the GRIN lens 161 and a second Doppler frequency shift based on movement of the GRIN lens 162. This frequency shift, and thus the sensitivity with which vibration velocity and amplitude are measured, is the same as with the sensor 60C of FIG. 6. The fiber 166 is shown to transmit the signal 72E for propagation through the mirror 146 with reflection off of the mirror 90, but the signal 72E may be routed directly to the detector 82.

Figure 10:
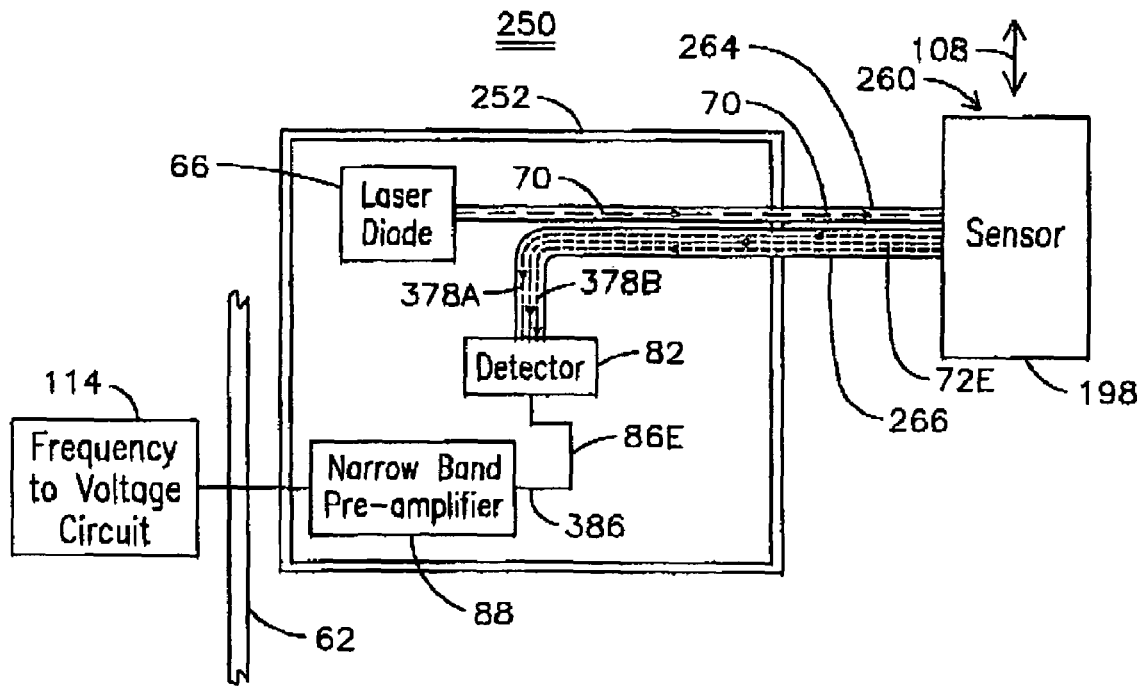
FIGS. 10 and 11 illustrate another alternate embodiment of a system for monitoring vibration according to the invention.
Figure 11:
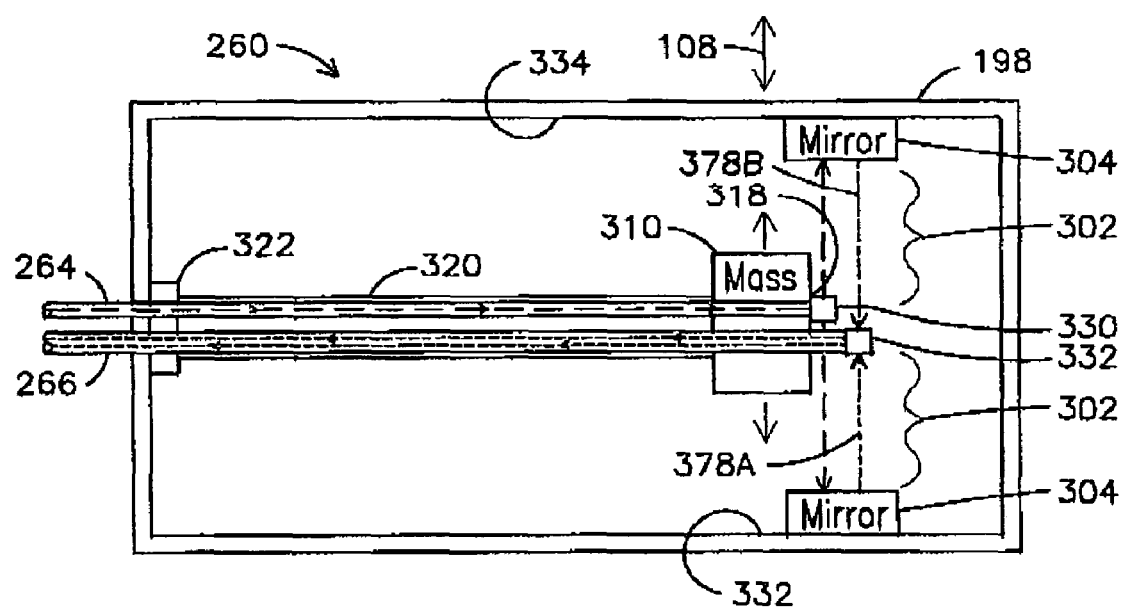

In still another embodiment of the invention, FIGS. 10 and 11 illustrate a system 250 for measuring vibration levels about a large industrial generator 52. This system includes an optical source and detector unit 252 coupled through two optical fibers 264 and 266 to transmit signals to and receive signals from an optical sensor section 260 including a sensor case 198, which may be rigidly mounted on, for example, a stator coil end turn of the generator 52. As described for the system of FIG. 3, all of the optical components associated with the system 250 may be contained within a pressurized region of the generator 52 on one side of the generator wall 62.

The optical receiver section 260 can provide twice the sensitivity gain than is attainable with the receiver section 60C of FIG. 6 with less noise interference than the receiver section 60D of FIG. 7. In this design a flex-beam 320 includes an unsecured end 318 and a secured end 322 mounted to the sensor case 198. The flex-beam 320 may be the same design, size and weight as described for the flex-beam 120 of FIG. 6. The optical fibers 264 and 266 extend from the detector unit 252 into the sensor case 198 and along the flex-beam 320 to the unsecured end 318 of the flex beam.

Initially, radiation 70 propagates from a laser diode 66 through the first optical fiber 264, into the optical receiver section 260 and to a first beam splitter device 330. The laser diode 66 may, preferably, be integrally formed with the optical fiber 264. With the radiation 70 following this path, the first beam splitter device 330 provides two radiation signals 378A and 378B emitted in opposing directions there from. The beam splitter device 330 may be a split dual Grin lens, also integrally formed with the fiber 264. Each signal propagates from the device 330 through a different one of two air spaces 302. The device 330 is aligned so that the signals 378A and 378B propagate in line with an axis 108 along which the flex-beam 320 has a degree of freedom. A mass 310 is mounted near the unsecured end 318 to provide an inertial factor determinative of resonant frequency for the flex-beam/mass/beam-splitter assembly as described with reference to FIG. 6.

In line with the axis 108, two mirrors 304 are positioned along opposing wall portions 332 and 334 of the sensor case 198 to each reflect a different one of the beam signals 378A or 378B back through one of the air spaces 302 to a second beam splitter device 332 for entry into the fiber 266 for propagation to a detector 82. The second beam splitter device 332 may be a split dual Grin lens integrally formed with the fiber 266.

With this arrangement, when the case 198 is vibrating in a direction parallel with the axis 108, one of the mirrors 304 will have both a velocity and a displacement in a direction toward the beam splitting device 332 while the other mirror 304 will have a velocity and a displacement in a direction away from the beam splitting device 332. Accordingly, the two beam signals are first and second signals which each incur Doppler frequency shifts in opposite directions from the other as the mirrors 304 vibrate with the case 198. With this effect there is a positive frequency shift from signal 378A when there is a negative frequency shift from signal 378B, i.e., they are 180 degrees out of phase, one increasing the frequency of the radiation 70, the other decreasing the frequency of the radiation 70. This reverses every half sensor case vibration cycle. The doubling of frequency shift increases the sensitivity with which vibration velocity 17 and amplitude are measured. With this effect there is a net frequency shift between the beams 378A and 378B which is twice that which occurs with a single mirror. This doubling of frequency shift increases the sensitivity with which vibration velocity and amplitude are measured.

The first and second signals 378A and 378B combine upon entry into the device 332 to create a beat frequency which is twice the beat frequency obtained with the embodiment of FIG. 6 for a given vibration amplitude. Moreover, the beams 378A and 378B, by traveling through the fiber 266, are isolated from the original frequency of radiation 70 such that the beams 378A and 378B do not mix with the original unshifted frequency. If the beams 378A and 378B were to propagate to the detector 82 through the fiber 264, they would mix with radiation 70 that has not undergone any Doppler shift and this may result in a more complex beat pattern. The embodiment of FIGS. 10 and 11 does not require a splitter device 90 as included in the embodiment of FIG. 3.

The detector 82 receives the signals 378A and 378B, and generates an electrical signal comprising a variable beat frequency signal 386 corresponding to the optical beat frequency. With appropriate pre- or post-filtering, the beat frequency signal 386 is converted into an isolated electrical signal for input to a narrow band preamplifier 88.

The resulting output from the preamplifier 88 is routed through a cable bus, such as illustrated in FIG. 2 or in U.S. 2005/0123230, to a main chassis unit for processing and determination, for example, of vibration amplitude, and whether the vibration energy has exceeded a predetermined threshold. After processing through the narrow band preamplifier 88, an analog frequency-to-voltage circuit 114 (e.g., positioned in the main chassis unit) converts the beat frequency signal $f_b$ into a voltage signal which is then scaled by $2c/f_c$ to determine u, the real-time velocity of vibrations on the seismic mounted mirror 104. Alternately, the average speed or peak displacement of vibration can be determined. The velocity signal can be integrated to provide the time-varying vibration displacement.

Example embodiments of the invention include methods of measuring the vibration amplitude of rotating machinery based on an optical Doppler frequency shift. In one method a source transmits radiation of a given frequency to a first device, e.g., a GRIN lens, mounted to receive vibrations. A portion of the radiation reaching the first device experiences a Doppler frequency shift as a result of the vibrations and is directed back to a detector unit as a first signal. Other radiation which has not experienced a Doppler shift is transmitted to the detector unit as a second signal. The detector unit provides an electrical signal corresponding to a variable beat frequency resulting from a combination of the first and second signals. The beat frequency may be used to determine the instantaneous velocity or average speed of vibrations as well as the amplitude of vibrations. The second signal may be transmitted directly from the source to the detector unit or may follow a similar path as the first signal. For example, when the device is a partially reflective—partially transmissive GRIN lens, a portion of the radiation transmitted to the first device may be transmitted there through and reflected by a second device, e.g., seismic mirror 104, or otherwise directed to propagate to the detector unit incurring a Doppler shift, i.e., the reflective surface is mounted to be non-responsive to the generated vibration signals. The first signal (e.g., signal 78) has a modulating frequency in accord with vibration movement of the reflective surface. This modulating reflected light follows a path coincident with-a path traversed by light reflected from the second device (e.g., the signal 72) such that both samples of light may enter a detector unit for conversion to electrical signals and then be processed by a frequency-to-voltage converter in order to generate an electrical signal corresponding to the variable beat frequency waveform.

Alternately, two signals of the same frequency $f_0$ may each undergo time varying Doppler shifts in opposite directions relative to $f_0$ such that mixing of the two variable frequency signals results in a beat frequency for processing by the detector unit. This renders it unnecessary to mix either of the variable frequency signals with the signal of frequency $f_0$.

Certain embodiments having one mirror in the sensor case result in two Doppler shifts while certain embodiments having two mirrors in the sensor case result in four Doppler shifts and greater sensitivity for measurement of vibration velocity and amplitude.

Other features of the invention include the ability to monitor activity at each of multiple sensors with a single optical fiber, since, for example, the laser radiation propagating from the diode 66 and the signals 72 and 78 may travel on the same fiber. Detector units according to the illustrated embodiments, located on the high pressure side of the generator wall, can simply consist of a laser diode, a detector, and a frequency-to-voltage converter. Twelve to sixteen sensors, or more, may be installed using only a two-twisted wire pair per sensor. With 16 sensors the total number of wire penetrations can be five: two wires for powering a radiation source, e.g., the laser diode 66, two wires for circuit power and one wire for carrying all signal communications, instead of 16 individual penetrations.

Measurement accuracy of the system 50 is frequency-based while independent of variation in light amplitude, dimensional parameters of the sensors and thermal effects. Corrections for light intensity are not required. Limitations in accuracy are largely a function of the stability in laser frequency. The measurement accuracy of an analog frequency-to-voltage converter is typically about one percent, while digital techniques based on a high frequency clock can provide further improvement in the measurement accuracy.

Although the invention has been described in relation to a large electrical generator, vibration monitoring systems constructed according to the invention may be used to monitor a wide variety of mechanical systems. Various embodiments of the present invention have been shown and described herein by way of example only. Numerous variations, changes and substitutions may be made without departing from the invention herein. For example, in lieu of the laser diode radiation source 66, other sources can be used to create the desired Doppler shifts, including light emitting diodes and, generally, monochromatic sources or sources with a sufficient degree of spatially coherence. Also, it will be apparent to those skilled in the art that numerous components may be substituted for the components illustrated herein and variations may be made to the light paths illustrated in the various exemplary embodiments without departing from the inventive concepts. Accordingly, it is intended that the invention be limited only by the scope of the appended claims.

The invention claimed is:

1. An apparatus for monitoring vibration levels in rotatable machinery comprising:
   a source for generating coherent radiation;
   a first partially transmissive and partially reflective device positioned to receive radiation from the source and transmit a part of the radiation there through;
   a second partially transmissive and partially reflective device mounted to the machinery, positioned to reflect a first signal and transmit radiation transmitted by the first device;
   a third device mounted to the machinery and positioned to reflect radiation transmitted through the second device to provide a second signal;
   circuitry configured to generate an electrical signal based on a combination of the first and second signals; and
   processing circuitry configured to provide a value indicative of vibration amplitude occurring in the machinery based on the combination of the first and second signals.

2. The apparatus of claim 1 wherein the processing circuitry calculates the value of vibration amplitude based on differences in frequency between the first and second signals.

3. The apparatus of claim 2 wherein the value of vibration amplitude is based on a beat frequency.

4. The apparatus of claim 1 wherein the third device is seismically mounted to the machinery to remain relatively isolated from machinery vibration along a first direction while the second device is mounted to the machinery for vibration therewith.

5. The apparatus of claim 1 wherein the third device is seismically mounted to the machinery to remain relatively isolated from machinery vibration along a first direction while the second device is mounted to the machinery for vibration at least along the first direction.

6. The apparatus of claim 1 wherein the third device is seismically mounted to the machinery to remain relatively isolated from machinery vibration along a first direction while mounted to the machinery for vibration therewith along a second direction and along a third direction.

7. The apparatus of claim 4 wherein the first direction is parallel with the direction along which radiation is transmitted from the second device to the third device.

8. The apparatus of claim 1 wherein the second and third devices are positioned within a case mounted along a surface of a generator.

9. The apparatus of claim 1 wherein the third device is separated from the second device by a space through which radiation can travel along an optical path in two opposite directions.

10. The apparatus of claim 1 wherein the source is separated from the first device by a space through which radiation can travel along an optical path.

11. The apparatus of claim 1 wherein the first device is a fiber optic cable splitter functioning as a partially silvered mirror.

12. The apparatus of claim 1 wherein the second device is a GRIN lens.

13. The apparatus of claim 1 wherein the third device is a mirror.

14. The apparatus of claim 1 with the second and third devices positioned to provide electrical signals indicative of vibration in a generator stator winding end-turn.

15. The apparatus of claim 1 further including an optical fiber having first and second ends, the first end coupled to receive the radiation from, and transmit part of the radiation back to, the first device, wherein the second end is coupled to:
   (i) provide radiation received at the first end to the second device for reflection of a first portion of the radiation to the first fiber end as the first signal, and for transmission of a second portion of the radiation through the second device to the third device; and
   (ii) transmit through the fiber radiation of the second portion reflected by the third device to provide the second signal.

16. The apparatus of claim 1 wherein the third device is mounted to a mass which is flexibly coupled for movement along a direction of gravitational force to remain relatively isolated from machinery vibration along the direction of gravitational force.

17. The apparatus of claim 16 wherein the mass is configured to slidably extend from a rod to effect relative isolation from the vibration.

18. A method for monitoring vibration levels in a rotatable machine comprising the steps of:
   providing a first radiation signal of a first frequency;
   deriving a second radiation signal of a variable doppler shifting frequency from the first signal;
   providing a value indicative of vibration amplitude occurring in the machinery based on a beat frequency generated with the second signal;
   and deriving a third radiation signal having a time-varying doppler shifting frequency relative to the first signal, wherein the beat frequency is generated based on a combination of the third signal.

19. The method of claim 18 wherein the second radiation signal of variable frequency is derived by introducing a variable doppler shift to a portion of the first signal based on vibration of the machine and the beat frequency is generated based on a combination of the first and second signals.

20. The method of claim 18 wherein the doppler shift is introduced by transmitting a portion of the first signal through a device mounted to vibrate with the machine.

21. The method of claim 18 wherein the signal of a variable frequency is based on relative motion between a first surface vibrating along a first direction and a second surface maintained in an inertial reference frame which is relatively non-vibratory along the first direction.

22. The method of claim 18 wherein the time-varying Doppler shifting frequency of the second signal is 180 degrees out of phase with the time-varying Doppler shifting frequency of the third signal.

* * * * *